(12) United States Patent
Kim

(10) Patent No.: US 8,920,972 B2
(45) Date of Patent: Dec. 30, 2014

(54) SECONDARY BATTERY INCLUDING WAVEFORM BOUNDARY SECTION

(75) Inventor: Hyun-Jeong Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 193 days.

(21) Appl. No.: 13/493,956

(22) Filed: Jun. 11, 2012

(65) Prior Publication Data

US 2012/0321946 A1 Dec. 20, 2012

(30) Foreign Application Priority Data

Jun. 17, 2011 (KR) ........................ 10-2011-0059137

(51) Int. Cl.
| | | |
|---|---|---|
| H01M 4/02 | (2006.01) | |
| H01M 4/04 | (2006.01) | |
| H01M 2/26 | (2006.01) | |
| B32B 38/00 | (2006.01) | |
| H01M 2/18 | (2006.01) | |

(52) U.S. Cl.
CPC ...... *H01M 2/26* (2013.01); *H01M 4/04* (2013.01); *H01M 2/18* (2013.01); *H01M 4/02* (2013.01)
USPC .......... 429/211; 429/209; 429/233; 29/623.4; 29/623.5; 156/182

(58) Field of Classification Search
USPC ............. 429/211, 209, 130, 131, 246, 7, 233; 156/182, 159; 29/623.1, 623.5, 623.4
See application file for complete search history.

(56) References Cited

U.S. PATENT DOCUMENTS

| | | | | |
|---|---|---|---|---|
| 6,234,225 B1 * | 5/2001 | Tanaka et al. | .................. | 156/390 |
| 6,423,446 B1 * | 7/2002 | Miyazaki et al. | ............. | 429/209 |
| 2001/0008727 A1 | 7/2001 | Cho | | |
| 2002/0197535 A1 * | 12/2002 | Dudley et al. | .................. | 429/246 |
| 2008/0248386 A1 * | 10/2008 | Obrovac et al. | ............... | 429/209 |
| 2010/0221607 A1 * | 9/2010 | Hatanaka et al. | ............. | 429/209 |
| 2010/0330267 A1 | 12/2010 | Shimizu et al. | | |
| 2011/0129701 A1 | 6/2011 | Seo | | |

FOREIGN PATENT DOCUMENTS

| | | |
|---|---|---|
| JP | 08-096802 A | 4/1996 |
| JP | 2008-159297 | 7/2008 |
| JP | 2010-080272 | 4/2010 |
| JP | 2011-119216 A | 6/2011 |
| KR | 10-2008-0030698 | 4/2008 |

OTHER PUBLICATIONS

Machine Translation of: JP 08/096802 A, Koga et al., Apr. 12, 1996.*
Machine Translation of: KR 1020080030698 A, Jung, Apr. 7, 2008.*
Korean Notice of Allowance issued on Aug. 30, 2013 in connection with KR Patent Application No. 10-2011-0059137 and Request for Entry of the Accompanying Office Action attached herewith.
Korean Office Action issued on Feb. 21, 2013 in the corresponding Korean Patent Application No. 10-2011-0059137.

* cited by examiner

*Primary Examiner* — Kenneth Douyette
(74) *Attorney, Agent, or Firm* — Robert E. Bushnell, Esq.

(57) ABSTRACT

A secondary battery includes a first electrode plate including a first active material coated area in which a first substrate is coated with a first active material and a first non-coated area not coated with the first active material; a second electrode plate including a second active material coated area in which a second substrate is coated with a second active material and a second non-coated area not coated with the second active material; and a separator interposed between the first and second electrode plates, wherein at least one of the first and second electrode plates includes an electrode assembly having a waveform boundary section between one active material coated area and one non-coated area. A manufacturing method of such secondary battery is also disclosed.

19 Claims, 9 Drawing Sheets

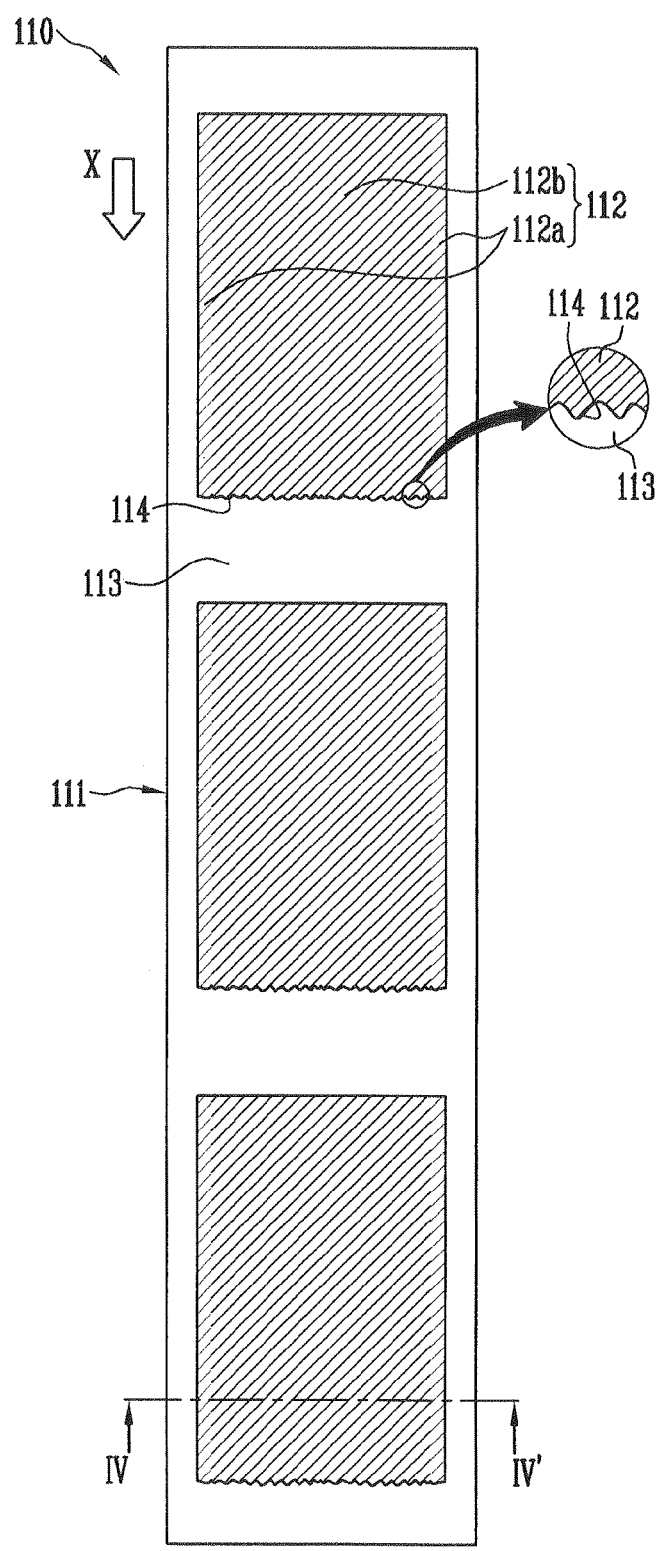

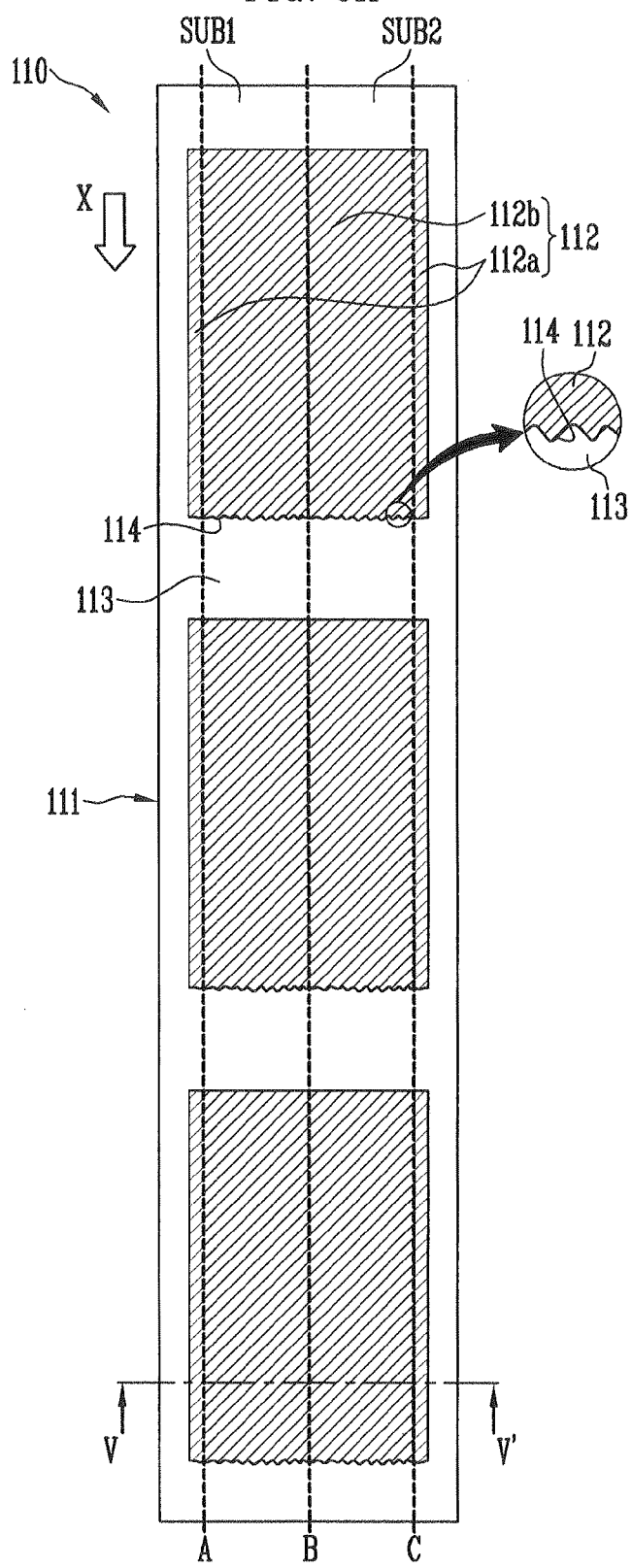

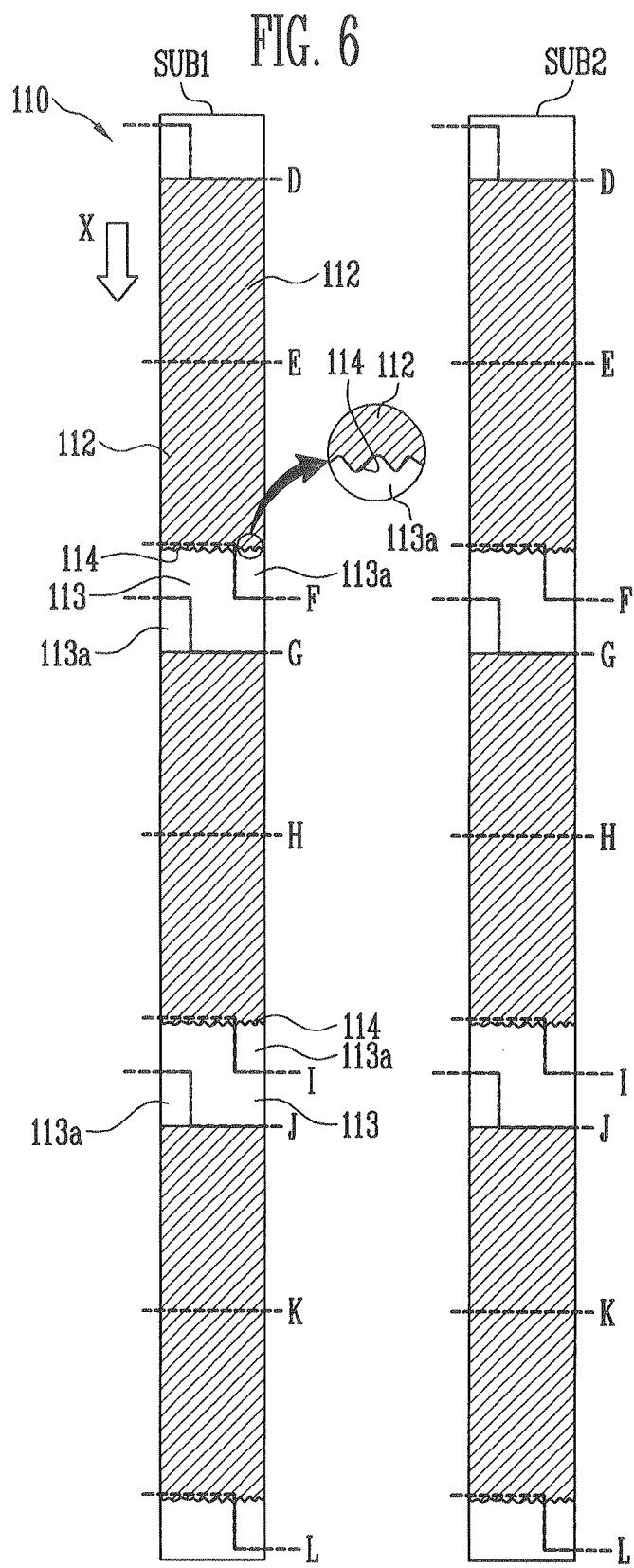

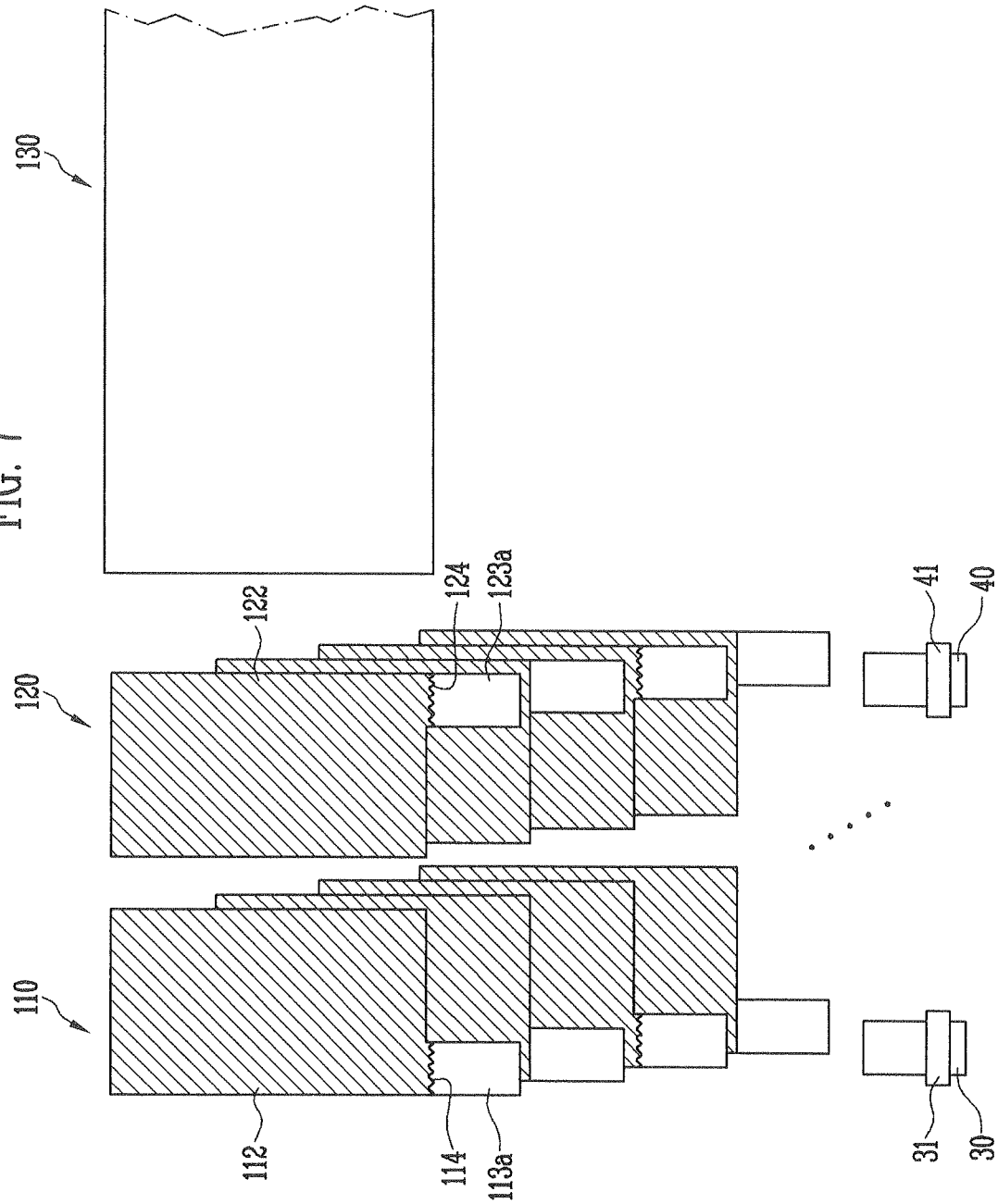

SECONDARY BATTERY INCLUDING WAVEFORM BOUNDARY SECTION

CLAIM OF PRIORITY

This application makes reference to, incorporates the same herein, and claims all benefits accruing under 35 U.S.C. §119 from an application earlier filed in the Korean Intellectual Property Office on 17 Jun. 2011 and there duly assigned Serial No. 10-2011-0059137.

BACKGROUND OF THE INVENTION

1. Field of the Invention

An embodiment of the present invention relates to an electrode assembly and a secondary battery including the electrode assembly, and more particularly, to a secondary battery in which safety and reliability are improved.

2. Description of the Related Art

In general, because secondary batteries may be charged and discharged over multiple cycles of use, the demand for secondary batteries that can be easily adopted for use as power supplies to drive portable electrical apparatus has increased concurrently with the fast development of electrical, electronic, communication, computer industries, and the related fields. Intensive research in various fields has been made in order to improve performance and safety due to the increasing number of applications for the batteries.

Further, the demand for miniaturization and for higher capacity of the secondary batteries has increased. The sizes of the secondary batteries have generally increased in order to increase the capacity of the secondary batteries. Concomitantly, various effort needs to be made to minimize the size of the rechargeable batteries in order to conform to the miniaturization of the portable electrical apparatus. Consequently, competing efforts for miniaturization and greater power capacity may be problematic in terms of safety; when the secondary battery is used as a power supply for an external electronic apparatus, a synergy effect created by the electronic apparatus may cause a higher risk of an impairment in the safety of the battery.

SUMMARY OF THE INVENTION

An aspect of the present invention provides a secondary battery in which safety is improved by using a new method for manufacturing the secondary battery.

Another aspect of the present invention provides a method of manufacturing a secondary battery in which productivity may be improved by reducing the rate of defective rate high-capacity secondary batteries.

An embodiment of the present invention provides a secondary battery that may be constructed with a first electrode plate including a first active material coated area in which a first substrate is coated with a first active material and a first non-coated area in which the first substrate is not coated with the first active material; a second electrode plate including a second active material coated area in which a second substrate is coated with a second active material and a second non-coated area in which the second substrate is not coated with the second active material; and a separator interposed between the first and second electrode plates. At least one of the first and second electrode plates includes a waveform boundary section disposed between one active material coated area and one non-coated area.

The first or second electrode plate may include a first or second substrate tab portion formed by extracting the first or second non-coated area.

Further, the first or second substrate tab portion may extend from the first or second active material coated area.

In this case, the first or second substrate tab portion may extend from the first or second active material coated area; the wave form boundary section may be provided between the first or second substrate tab portion and the first or second active material coated area.

The first or second electrode plate may be provided by intermittently coating the corresponding substrate with the corresponding active material.

The first or second electrode plate may include one or more first or second active material coated areas which are consecutively provided in a coated direction along which the corresponding active material is coated on the corresponding substrate, and one or more first or second non-coated areas may be provided between the first or second active material coated areas.

Further, the first or second electrode plate may include one or more waveform boundary sections provided between the first or second active material coated area and the first or second non-coated area in the coated direction of the active material.

The first or second electrode plate may include one or more first or second substrate tab portions provided by extracting the first or second non-coated area, and the first or second substrate tab portions may be arranged in a zigzag pattern formed in the coated direction of the active material.

In the first or second electrode plate, the center of the first or second active material coated area may be slit.

The waveform boundary section may be provided at the rear end of the first or second active material coated area in the coated direction of the first or second active material.

Another embodiment of the present invention provides a manufacturing method of a secondary battery, the manufacturing method includes steps of forming a first electrode plate including one or more first active material coated areas in which a first substrate is coated with a first active material and a first non-coated area in which the first substrate is not coated with the first active material; forming a second electrode plate including one or more second active material coated areas in which a second substrate is coated with a second active material and a second non-coated area in which the second substrate is not coated with the second active material; forming a first substrate tab portion of the first electrode plate by extracting the first non-coated area; forming a second substrate tab portion of the second electrode plate by extracting the second non-coated area; and laminating the first and second electrode plates with a separator interposed between the first and second electrode plates.

In the formation of the first or second electrode plate, one or more first or second active material coated areas may be provided by intermittently coating the first or second substrate with the first or second active material.

In the formation of the substrate tab portions, the first or second non-coated area may be extracted; the first or second non-coated area may be extracted so that one or more waveform boundary sections may be included between the first or second active material coated area and the first or second substrate tab portion.

In the formation of the substrate tab portions, the first or second electrode plate may be extracted so that the first or second substrate tab portion is arranged in a zigzag pattern formed in a coated direction along which of the first or second active material is coated on the corresponding substrate.

In the step of laminating of the electrode plates, the electrode plates may be laminated with the first and second substrate tab portions extending along a same direction. The first and second electrode plates may be alternatively laminated with the first and second substrate tab portions being not overlapped with each other.

In accordance with the embodiments of the present invention, it is possible to improve the safety of the secondary battery by preventing a voltage drop caused by an internal short-circuit.

Further, the embodiments of the present invention provide a manufacturing method of a secondary battery in which productivity is improved by efficiently fabricating an electrode assembly configuring a high-capacity secondary battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4A is a diagram schematically showing a positive electrode plate coating step of FIG. 3.

FIG. 5A is a diagram schematically showing a positive electrode plate slitting step.

FIG. 6 is a diagram schematically showing a positive electrode plate extracting step of FIG. 3.

FIG. 7 is a diagram schematically showing an electrode plate laminating step of FIG. 3.

DETAILED DESCRIPTION OF THE INVENTION

Figure 1:
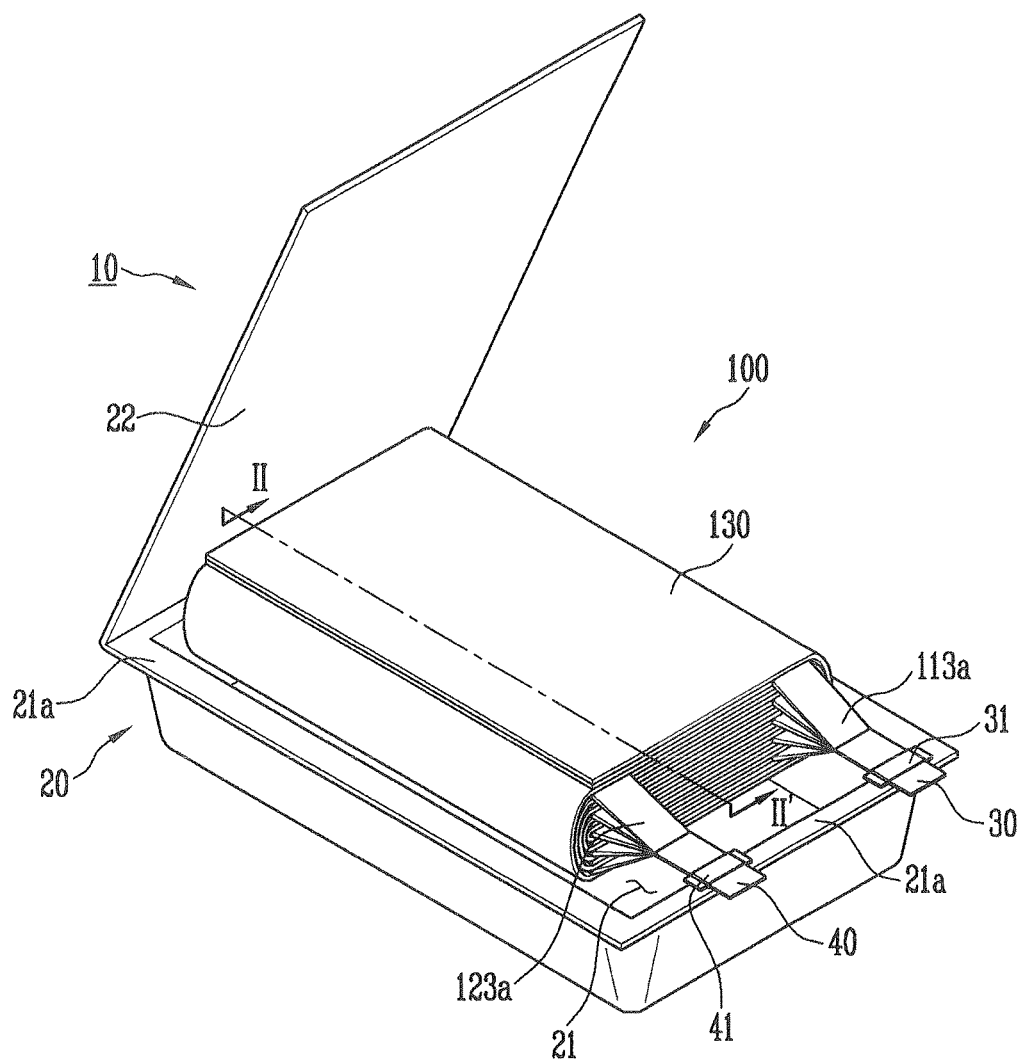
FIG. 1 is an exploded perspective view of a secondary battery constructed with an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Details of other embodiments are included in the detailed description and the accompanying drawings.

Advantages and characteristics of the present invention, and methods for achieving them will be apparent with reference to embodiments described below in detail in addition to the accompanying drawings. However, the present invention is not limited to the embodiments to be described below, but may be modified in various different ways. Also, when an element is referred to as being "connected to" another element, it can be directly connected to the another element or be indirectly connected to the another element with one or more intervening elements interposed therebetween. Further, elements not related with the embodiments of the present invention are not shown in the drawings for clear description of the embodiments of the present invention. Throughout the specification, like reference numerals refer to like elements.

Hereinafter, embodiments of the present invention will be described with reference to the accompanying drawings.

Figure 2A:
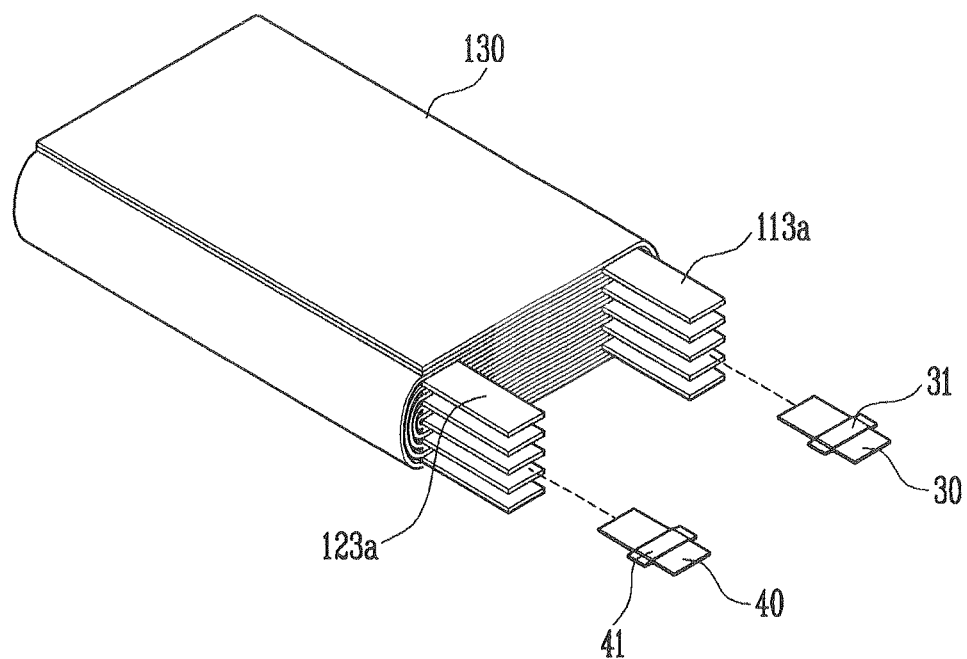
FIG. 2A is a perspective view of an electrode assembly of the secondary battery shown in FIG. 1.

FIG. 1 is an exploded perspective view of a secondary battery constructed with an embodiment of the present invention. FIG. 2A is a perspective view of an electrode assembly of FIG. 1 and FIG. 2B is a cross-sectional view take along line II-II' of FIG. 1.

Figure 2B:
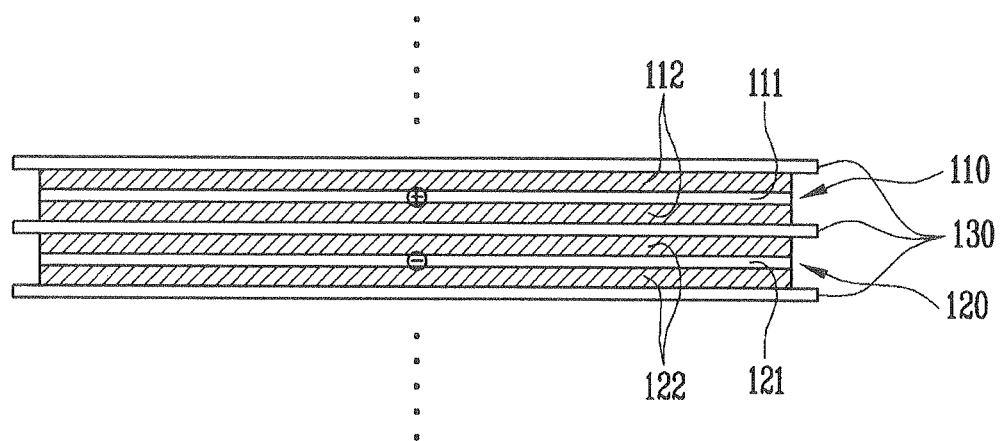
FIG. 2B is a cross-sectional view take along line II-II' of FIG. 1.

Referring to FIGS. 1 through 2B, the secondary battery 10 constructed with the embodiment of the present invention includes a first electrode plate 110 including a first active material coated area 112 in which a substrate 111 is coated with a first active material and a first non-coated area 113 (shown in FIG. 4A) in which the substrate 111 is not coated with the first active material, a second electrode plate 120 including a second active material coated area 122 in which a substrate 121 is coated with a second active material and a second non-coated area in which the substrate 121 is not coated with the second active material, and a separator 130 interposed between the first and second electrode plates 110 and 120. At least one of the first and second electrode plates 110 and 120 of an electrode assembly 100 respectively includes waveform boundary sections 114 and 124 (see FIG. 7) between the active material coated areas 112 and 122 and the non-coated areas.

Referring to FIGS. 1 through 2B, the electrode assembly 100 constructed with the embodiment may include one or more first and second electrode plates 110 and 120 and the separator 130 interposed between the electrode plates 110 and 120. Further, the secondary battery 10 may include the electrode assembly 100 and a battery case 20.

The first electrode plate 110 may be a positive electrode plate, and the first active material may include a positive active material. The positive electrode plate 110 may include a positive active material coated area 112 in which the substrate 111 is coated with the positive active material and a positive non-coated area in which the substrate 111 is not coated with the positive active material.

The second electrode plate 120 may be a negative electrode plate, and the second active material may include a negative active material. The negative electrode plate 120 may include a negative active material coated area 122 in which the substrate 121 is coated with the negative active material and a negative non-coated area in which the substrate 121 is not coated with the negative active material.

The separator 130 may be interposed between the positive electrode plate 110 and the negative electrode plate 120. The separator 130 serves as a passage of ions and prevents the positive electrode plate 110 and the negative electrode plate 120 from being in direct contact with each other.

Further, the positive electrode plate or negative electrode plate 110 or 120 may include a positive or negative electrode substrate tab portions 113a and 123a provided by extracting the positive or negative non-coated area. In this case, the positive or negative electrode substrate tab portions 113a or 123a may extend from the active material coated area 112 or 122. The positive or negative electrode substrate tab portion 113a or 123a may be made of a portion of the positive or negative non-coated area. The positive or negative electrode substrate tab portion 113a or 123a may directly extend from the active material coated area 112 or 122, and may be in immediate contact with the active material coated area 112 or 122.

In general, the electrode assembly may be classified into a wind type or a lamination type in accordance with the manufacturing method thereof, and the electrode assembly may be changed appropriately in accordance with a design of the secondary battery. In this case, in the secondary battery including the lamination type electrode assembly, the electrode assembly may be provided with the positive electrode plate and the negative electrode plate constituted by a plurality of unit bodies facing each other; however, the positive electrode plate and the negative electrode plate may be alternately laminated with the separator interposed between the electrode plates.

In the electrode assembly 100 constructed with the embodiment of the present invention, electrode plates may be laminated by arranging the positions of the positive or negative electrode substrate tab portions 113a and 123a of the electrode plates so that electrodes plates having different polarities may be prevented from being in direct contact with each other and electrode plates having the same polarity may be easily connected to each other. Further, each of the electrode plates may include the positive or negative electrode substrate tab portion 113a or 123a. The positive or negative electrode substrate tab portion 113a or 123a may be provided at the non-coated area of each electrode plate in order to improve safety and productivity of the battery.

As shown in FIG. 2A, the positive electrode plate and the negative electrode plate 110 and 120 may be alternately laminated with the positive and negative electrode substrate tab portions 113a and 123a extending in the same direction; the positive electrode plate and the negative electrode plate 110 and 120 may be laminated with the positive and negative electrode substrate tab portions 113a and 123a not overlapped with each other. In the electrode assembly 100 manufactured as above, the positive and negative electrode substrate tab portions 113a and 123a may be drawn out to the outside through the separator 130. In this case, the positive electrode plate 110 and the negative electrode plate 120 may be laminated on each other in an arrangement in which, the substrate tab portions having the same polarity are disposed adjacent to each other and are arranged in line with each other, and the substrate tab portions having different polarities are arranged to be spaced apart from each other. The positive electrode substrate portion 113a and the negative electrode substrate tab portion 123a may serve as a passage for transferring electrochemical energy generated from each electrode plate.

As shown in FIG. 2A, the electrode plates having the same polarity may be collected to be welded to each other and the welded portions of the positive and negative electrode substrate tab portions 113a, 123a may be extended by a positive electrode lead 30 and a negative electrode lead 40, respectively. The positive electrode lead 30 and the negative electrode lead 40 may be provided with the electrode plates being easily in electrical connection with the outside, and the positive electrode lead 30 and the negative electrode lead 40 are not limited in terms of materials and shapes. Further, the positive electrode lead 30 and the negative electrode lead 40 may further include insulative lead tapes 31 and 41, respectively.

The electrode assembly 100 manufactured as above may be received in the battery case 20 together with an electrolytic solution. In this case, the electrolytic solution may be provided with current easily moving between the electrode plates. The electrolytic solution may include lithium salt serving as a supply source of lithium ions and a non-aqueous organic solvent serving as a medium where ions associated with an electrochemical reaction can move.

The battery case 20 may include a pouch constituted by a body 21 having a receivable space and a cover 22. In the pouch 20, the electrode assembly 100 and the electrolytic solution are received in the body 21, and the body 21 is sealed by the cover 22 in order to prevent the received electrode assembly 100 and electrolytic solution from being separated from each other. In this case, a sealing portion 21a may be provided at the edge of the body 21. The secondary battery 10 may be manufactured by receiving the electrode assembly 100 and the electrolytic solution in the body 21 of the pouch 20 and by heat-welding the sealing portion 21a with the body 21 and the cover 22 closely contacting each other.

As shown in FIG. 1, the electrode assembly 100 may be received by the pouch 20 with the positive electrode lead 30 and the negative electrode lead 40 protruding to the outside of the pouch 20. The lead tapes 31 and 41 provided in the positive electrode lead 30 and the negative electrode lead 40 may be provided at portions of the positive and negative electrode leads 30 and 40 contacting the sealing portion 21a, respectively. Accordingly, it is possible to prevent a short circuit from being caused between the positive electrode lead 30 and the negative electrode lead 40, and the pouch 20, when the pouch 20 is heat-welded.

Figure 3:
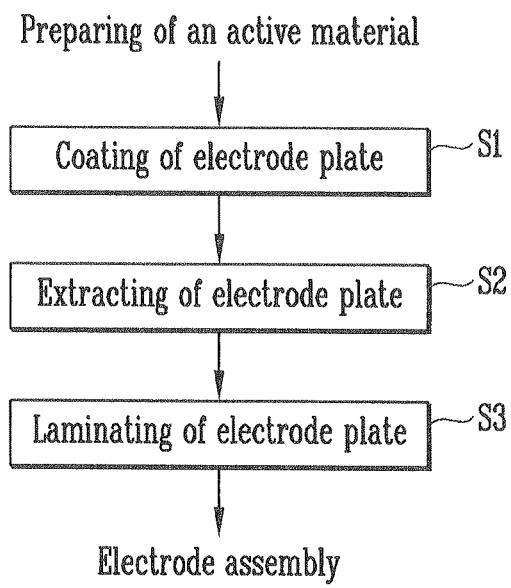
FIG. 3 is a flowchart showing a manufacturing method of a secondary battery constructed with an embodiment of the present invention.

FIG. 3 is a flowchart showing a manufacturing method of a secondary battery constructed with an embodiment of the present invention.

Referring to FIG. 3, in the manufacturing method of the secondary battery constructed with the embodiment of the present invention, a positive active material and a negative active material are prepared, and thereafter, an electrode assembly may be manufactured by using the prepared positive and negative active materials. The manufacturing method of the secondary battery may include an electrode plate coating step (S1), an electrode plate extracting step (S2), and an electrode laminating step (S3).

Figure 4B:
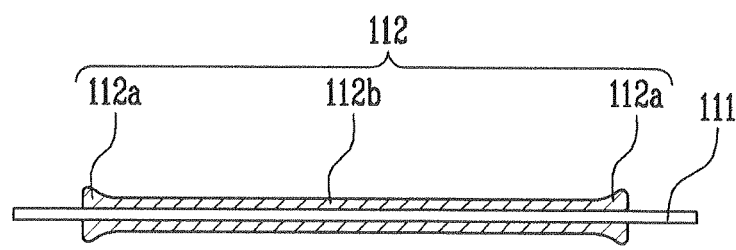
FIG. 4B is a cross-sectional view take along line IV-IV' of FIG. 4A.
Figure 5B:
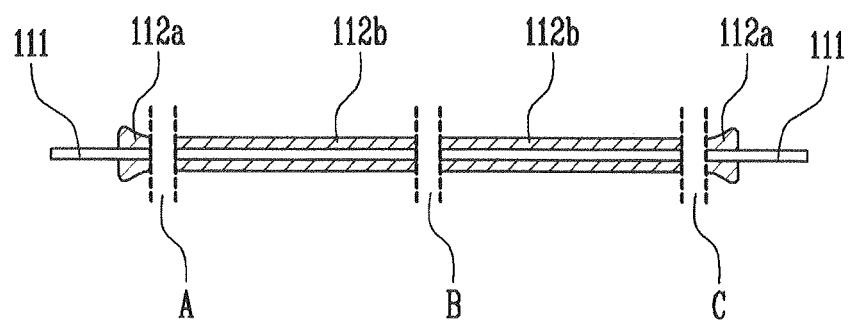
FIG. 5B is a cross-sectional view take along line V-V' of FIG. 5A.

FIG. 4A is a diagram schematically showing a positive electrode plate coating step (S1 of FIG. 3) and FIG. 4B is a cross-sectional view take along line IV-IV' of FIG. 4A. FIG. 5A is a diagram schematically showing a positive electrode plate slitting step, and FIG. 5B is a cross-sectional view take along line V-V' of FIG. 5A. FIG. 6 is a diagram schematically showing a positive electrode plate extracting step (S2 of FIG. 3). Even though only the positive electrode plate is shown in FIGS. 4A through 6, a negative electrode plate may be shown similarly.

Referring to FIGS. 3 through 6, the manufacturing method of the secondary battery 10 includes (1) coating (S1 of FIG. 3) a positive electrode plate 110 including a positive active material coated area 112 in which a substrate 111 is coated with a positive active material and a positive non-coated area 113 in which the substrate 111 is not coated with the positive active material, and similarly, coating (S1) a negative electrode plate 120 including a negative active material coated area 122 in which a substrate 121 is coated with a negative active material and a negative non-coated area 123 in which the substrate 121 is not coated with the negative active material; (2) extracting (S2 of FIG. 3) the positive electrode plate 110 including a positive electrode substrate tab portion 113a by extracting the positive non-coated area 113, and similarly, extracting (S2) the negative electrode plate 120 including a negative electrode substrate tab portion 123a by extracting the negative non-coated area 123; and (3) laminating (S3 of FIG. 3) the positive electrode plate 110 and the negative electrode plate 120 with a separator 130 interposed between the positive electrode plate 110 and the negative electrode plate 120.

Referring to FIGS. 4A through 5B, in the coating of the electrode plates (S1), one or more positive or negative active material coated areas 112 are provided by intermittently coating the substrate 111 with the positive or negative active material. In this case, the positive and negative active materials can be variously changed depending on the secondary battery; in the embodiment, the positive or negative active material is prepared as a slurry type by using a lithium compound as the positive active materials or graphite as the negative active material and then mixing the lithium compound or the graphite with a solvent.

That is, the positive electrode plate 110 or the negative electrode plate 120 may be provided by intermittently coating the substrate 111 with the positive or negative active material. Intermittent coating means not coating the substrate with the active material at one time but performing coating with a pause between coating and coating. As shown in FIGS. 4A, 5A and 6, by the intermittent coating, the positive electrode plate 110 or negative electrode plate 120 may include one or more positive active material coated areas 112 or negative active material coated areas which are discontinuously provided in an X direction which is a direction of coating the active material.

The positive non-coated area 113 may be provided between adjacent positive active material coated areas 112; similarly, the negative non-coated area may be provided between adjacent negative active material coated areas. The positive non-coated area 113 or the negative non-coated area which is not coated with the active material, and the substrate is exposed through the active material. Further, in the positive active material coated area 112 or the negative active material coated area, coating can be performed at a regular interval in the intermittent coating so as to massively produce the positive electrode plates 110 or negative electrode plates. Therefore, one or more positive non-coated areas 113 or negative non-coated areas provided in the positive electrode plate 110 or negative electrode plate may have substantially the same dimension as each other.

Further, along the X direction of FIGS. 4A, 5A and 6, the positive electrode plate 110 or negative electrode plate may include one or more waveform boundary sections 114 provided between the positive active material coated area 112 and the positive non-coated area 113 or between the negative active material coated area and the negative non-coated area. The waveform boundary section 114 may be provided at the end of one positive active material coated area 112 or negative active material coated area in the X direction.

In contemporary manufacturing methods of batteries, the positive electrode plate 110 or negative electrode plate is generally manufactured by continuously performing coating without the pause between coating and coating except for both edges of the substrate along the coating direction at the time of coating the substrate with the active material. Therefore, a single positive or negative active material coated area is provided in each electrode plate, and the non-coated areas not coated with the active material are provided at both edges of the single positive or negative active material coated area. The non-coated area is extracted afterwards to configure the positive electrode substrate tab portion or negative electrode substrate tab portion.

Further, active material coating is a successive process of spreading a bulk positive or negative active material on a substrate with a predetermined thickness. Specifically, the active material is laid on the substrate in the slurry type, and the substrate is coated with the active material to be spaced apart from the substrate by a predetermined gap, for example, by using a blade. When the amount of the active material coated per dimension is represented by a loading level, both edges of the single active material coated area are higher than the center of the active material coated area at the active material loading level in the coated direction of the active material. Further, when a coating width increases, a deviation in the active material loading level between the center and the edges increases. A cross section of the coated electrode plate has a crown shape in which both edges is the higher and the center is the lower.

The deviation of the loading level in the electrode plate may cause unbalance of a current flow, and the reliability of the secondary battery may deteriorate in long-time use. Further, since current concentrates on both edges to increase resistance, safety of the secondary battery may deteriorate.

In general, at both edges in the coated direction of the active material in the electrode plate, the deviation of the active material loading level may cause performance of the secondary battery to deteriorate. Nevertheless, since the positive electrode plate and negative electrode plate include the substrate tab portions by using the non-coated area provided adjacent to both edges, the positive electrode plate and negative electrode plate include both edges.

Since the secondary battery manufactured by the contemporary methods has the above-mentioned problems and is limited in a width coated with the active material, it may be problematic in manufacturing a high-capacity secondary battery.

The secondary battery constructed with the embodiment of the present invention may include the positive electrode plate 110 or negative electrode plate which is intermittently coated. The electrode plates may include one or more positive active material coated areas 112 or negative active material coated areas, and may include the positive non-coated area 113 or negative non-coated area between the adjacent active material coated areas.

As shown in FIGS. 4A, 5A and 6, the positive electrode plate 110 or negative electrode plate may include the positive electrode substrate portion 113a or negative electrode substrate tab portion at the non-coated area provided between the active material coated areas. Therefore, the non-coated areas provided at both edges in the X direction are not required. That is, as shown in FIGS. 5A and 5B, since the positive electrode plate 110 or negative electrode plate may adopt an electrode plate in which a peripheral portion 112a having a relatively high active material loading level is slit in the active material coated area, the problem in safety depending on the active material loading level of the peripheral portion 112a may be prevented. In addition, since the positive electrode plate 110 or negative electrode plate has no limitation in an active material coating width, the high-capacity secondary battery may be easily manufactured.

As shown in FIGS. 5A and 5B, for example, the electrode plate 110 may be slit at lines A, B and C, in order to remove the peripheral portion 112a and retain the uniform portion 112b and to obtain two uniformly coated sub electrode plates SUB1 and SUB2.

Referring to FIG. 6, during the extracting of the electrode plate (S2), in the positive electrode plate 110 or negative electrode plate, the positive non-coated area 113 or negative non-coated area is extracted; however, the positive non-coated area 113 or negative non-coated area may be extracted so that one or more waveform boundary sections 114 are included between an active material coated area 112 and a substrate tab portion. Further, during the extracting of the electrode plate (S2), the electrode plates may be extracted so that the positive electrode substrate tab portions 113a or negative electrode substrate tab portions are arranged in zigzag in the X direction.

As shown in FIG. 6, for example, each of electrode plates SUB1 and SUB2 may be slit at lines A through L so that the electrode substrate tab portions and the active material coated areas may be formed; a waveform boundary sections 114 may be disposed between an electrode substrate tab portion and an active material coated area.

As described above, the coating of the active material is performed so that the slurry type active material is spread on the substrate by using the blade; in this case, the active material coated area may include the waveform boundary section 114 by X-direction dragging caused by a friction force between the active material and the substrate. In particular, this may occur more frequently at a front end than at a rear end of the active material coated area, and the waveform boundary section 114 is adjacent to the rear end of the active material coated area 112 to be present more clearly on the boundary of the extracted substrate tab portion 113a. In FIG. 6, the waveform boundary section 114 is shown at only the rear end of the active material coated area 112 which is present relatively more frequently, but may be provided at even the front end of the active material coated area 112.

The positive electrode substrate tab portion 113a or negative electrode substrate tab portion extends from each active material coated area, and the waveform boundary section 114 may be disposed between the substrate tab portion and the active material coated area. The positive electrode plate 110 or negative electrode plate includes one or more positive electrode substrate tab portions 113a or negative electrode substrate tab portions provided by extracting the positive non-coated area 113 or negative non-coated area, and the positive electrode substrate tab portions 113a or negative electrode substrate tab portions may be arranged in zigzag in the coated direction of the active material.

Since the substrate tab portion does not include the active material, the substrate tab portion cannot contribute to the capacity of the secondary battery. The substrate tab portion safely connects the electrode plates to each other. Further, the substrate tab portion should have a predetermined size or larger according to the design of the secondary battery, and the substrate tab portion may be provided by extracting adjacent non-coated areas in zigzag. Therefore, in the extracting of the electrode plate (S2) since unnecessarily wasted substrates may be reduced, a production coast may be saved.

In the positive electrode plate 110 or negative electrode plate, the center of each active material coated area may be slit. Since each active material coated area may be divided into at least two by one-time slitting (FIG. 6), the number of intermittent coating times may be reduced. Accordingly, a production time of the secondary battery may be shortened and the unnecessary substrate waste may be minimized, the production cost may be decreased.

FIG. 7 is a diagram schematically showing an electrode plate laminating step (S3).

Referring to FIG. 7, during the laminating of the electrode plate (S3 of FIG. 3), the positive electrode plate 110 and the negative electrode plate 120 are laminated so that the positive and negative electrode substrate tab portions 113a and 123a extend along the same direction; the positive electrode plate 110 and the negative electrode plate 120 are alternately laminated so that the positive and negative electrode substrate tab portions 113a and 123a are not overlapped with each other.

Since the electrode plates may have different polarities, the electrode plates contact each other directly in order to prevent the short circuit. On the contrary, the positive electrode plate 110 and the negative electrode plate 120 are placed adjacent to each other so that the current flow of the secondary battery is efficiently performed. Therefore, in the laminating of the electrode substrate (S3), the electrode plates are alternately laminated with the separator 130 interposed between the electrode plates.

Further, during the laminating of the electrode plate (S3 of FIG. 3), the positive electrode substrate tab portion 113a and the negative electrode substrate tab portion 123a drawn from the electrode plates, respectively are arranged in line with each other among the substrate tab portions having the same polarity in order to electrically connect the electrode plates having the same polarity; in this case, the substrate tab portions having different polarities are spaced apart from each other in order to prevent short circuit.

In this case, the waveform boundary section 114 or 124 may be provide between the positive active material coated area 112 and the positive electrode substrate tab portion 113a or between the negative active material coated area 122 and the negative electrode substrate tab portion 123a. The positive and negative non-coated areas 113 and 123 are connected at the front end or rear end of the active material coated areas 112; as a result, the waveform boundary section may be formed between the non-coated area and the active material coated area by the active material dragging which may occur at the time of coating the active material. Further, since the positive and negative electrode substrate tab portions 113a and 123a are provided by extracting the non-coated areas 113 and 123, the active material dragging formed at the front or rear end of the active material coated area, in particular, the rear end of the active material coated area, remains the waveform boundary sections 114 and 124 on the boundary with the substrate tab portion, and the rest of the non-coated areas 113 and 123 may be removed.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and—equivalents thereof.

What is claimed is:

1. A secondary battery, comprising:
a first electrode plate comprising a first active material coated area in which a first substrate is coated with a first active material and a first non-coated area in which the first substrate is not coated with the first active material;
a second electrode plate comprising a second active material coated area in which a second substrate is coated with a second active material and a second non-coated area in which the second substrate is not coated with the second active material; and
a separator interposed between the first and second electrode plates,
wherein at least one of the first and second electrode plates has a waveform boundary section disposed between one active material coated area and a corresponding non-coated area.

2. The secondary battery of claim 1, wherein the at least one of the first and second electrode plates includes a substrate tab portion made of a portion of the corresponding non-coated area of the at least one of the first and second electrode plates.

3. The secondary battery of claim 2, wherein the substrate tab portion extends from the corresponding active material coated area of the at least one of the first and second electrode plates.

4. The secondary battery of claim 3, wherein the wave form waveform boundary section is provided between the substrate tab portion and the corresponding active material coated area of the at least one of the first and second electrode plates.

5. The secondary battery of claim 1, wherein the at least one of the first and second electrode plates is provided by intermittently coating the corresponding substrate with the corresponding active material.

6. The secondary battery of claim 5, wherein:
the at least one of the first and second electrode plates includes one or more active material coated areas which are consecutively provided in a direction along which the corresponding active material is coated on the corresponding substrate, and
one or more corresponding non-coated areas are provided between two neighboring active material coated areas.

7. The secondary battery of claim 6, wherein the at least one of the first and second electrode plates includes one or more waveform boundary sections disposed between the corresponding active material coated area and the corresponding non-coated area in the direction along which the corresponding active material is coated on the corresponding substrate.

8. The secondary battery of claim 7, wherein:
the at least one of the first and second electrode plates includes one or more substrate tab portions respectively made of a portion of the corresponding non-coated area of the at least one of the first and second electrode plates, and
the one or more substrate tab portions are arranged in a zigzag pattern formed in the direction along which the corresponding active material is coated on the corresponding susbtrato substrate.

9. The secondary battery of claim 1, wherein, in the at least one of the first and second electrode plates, the center of the corresponding active material coated area is slit.

10. The secondary battery of claim 1, wherein the waveform boundary section is provided at a rear end of the one active material coated area in a direction along which the corresponding active material is coated on the corresponding substrate.

11. A manufacturing method of a secondary battery, comprising:
forming a first electrode plate including a first active material coated area in which a first substrate is coated with a first active material and a first non-coated area in which the first substrate is not coated with the first active material;
forming a second electrode plate including a second active material coated area in which a second substrate is coated with a second active material and a second non-coated area in which the second substrate is not coated with the second active material;
forming a first substrate tab portion of the first electrode plate by extracting the first non-coated area of the first electrode plate;
forming a second substrate tab portion of the second electrode plate by extracting the second non-coated area of the second electrode plate; and
laminating the first and second electrode plates with a separator interposed between the first and second electrode plates,
wherein, in the formation of the first and second substrate tab portions, the first and second non-coated areas are extracted so that a plurality of waveform boundary sections are respectively disposed between corresponding active material coated areas and corresponding substrate tab portions.

12. The method of claim 11, wherein, in the formation of the first and second electrode plates, a plurality of active material coated areas are formed on at least one of the first and second electrode plates by intermittently coating the corresponding substrate with the corresponding active material.

13. The method of claim 11, wherein, in the formation of the first and second substrate tab portions, the first and second electrode plates are extracted so that the first and second substrate tab portions are arranged in a zigzag pattern formed in a direction along which the corresponding active material is coated on the corresponding susbtrato substrate.

14. The method of claim 11, wherein,
in step of laminating the first and second electrode plates, the first and second electrode plates are laminated with the first and second substrate tab portions respectively extending from the corresponding active material coated area along a same direction, and
the first and second electrode plates are alternatively laminated with the first and second substrate tab portions being not overlapped with each other.

15. The method of claim 14, wherein the first and second substrate tab portions are spaced apart from each other.

16. The method of claim 14, further comprising a step of electrically connecting a plurality of first substrate tab portions to each other.

17. The method of claim 16, further comprising a step of electrically connecting a plurality of second substrate tab portions to each other.

18. A secondary battery manufactured by the method of claim 11, comprising at least one of the first and second electrode plates has a waveform boundary section disposed between one active material coated area and a corresponding non-coated area.

19. A secondary battery manufactured by the method of claim 11, comprising:
at least one of the first and second electrode plates has a waveform boundary section disposed between one active material coated area and a corresponding non-coated area;
at least one of the first and second electrode plates includes a substrate tab portion made of a portion of the corresponding non-coated area of the at least one of the first and second electrode plates;
the substrate tab portion extends from the corresponding active material coated area of the at least one of the first and second electrode plates; and
the waveform boundary section is provided between the substrate tab portion and the corresponding active material coated area of the at least one of the first and second electrode plates.

* * * * *